(12) United States Patent
Dotterweich et al.

(10) Patent No.: US 10,482,415 B1
(45) Date of Patent: Nov. 19, 2019

(54) SYSTEMS AND METHODS FOR CUSTOMIZED SHIPMENT NOTIFICATIONS

(71) Applicant: UNITED PARCEL SERVICE OF AMERICA, INC., Atlanta, GA (US)

(72) Inventors: Andrew Dotterweich, Milton, GA (US); Juan Perez, Milton, GA (US); Jean Mense, Roswell, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 537 days.

(21) Appl. No.: 14/099,468

(22) Filed: Dec. 6, 2013

(51) Int. Cl.
*G06Q 10/08* (2012.01)

(52) U.S. Cl.
CPC ....... *G06Q 10/0833* (2013.01); *G06Q 10/083* (2013.01); *G06Q 10/0837* (2013.01)

(58) Field of Classification Search
CPC ...................................................... G06Q 10/08
See application file for complete search history.

(56) References Cited

U.S. PATENT DOCUMENTS

| | | | | |
|---|---|---|---|---|
| 7,212,829 | B1 * | 5/2007 | Lau | G06Q 10/00 340/539.13 |
| 2006/0136236 | A1 * | 6/2006 | Horton | G06Q 10/08 705/330 |
| 2007/0299686 | A1 * | 12/2007 | Hu | G06Q 20/20 705/407 |
| 2012/0066153 | A1 * | 3/2012 | Whitehouse | G07B 17/00193 705/407 |
| 2012/0303541 | A1 * | 11/2012 | Marcus | G06Q 10/00 705/330 |
| 2013/0346337 | A1 * | 12/2013 | O'Donnell | G06Q 10/0833 705/333 |
| 2014/0100991 | A1 * | 4/2014 | Lenahan | G06Q 30/0625 705/26.62 |

OTHER PUBLICATIONS

Najjar, Lawrence J. "28 Designing E-commerce User Interfaces." (2005).*

* cited by examiner

*Primary Examiner* — Daniel Vetter
*Assistant Examiner* — Scott M Tungate
(74) *Attorney, Agent, or Firm* — Shook, Hardy & Bacon L.L.P.

(57) ABSTRACT

Various embodiments of the present invention involve systems, methods, and computer program products that provide enhanced messages. In embodiment, a method for sending messages is provided that includes receiving shipping data that includes a destination address for delivery of an item, a message address for sending a notification message, customized data and a trigger event. In response to an occurrence of the triggering event, a notification message is sent to the message address and providing access to the customized data.

26 Claims, 8 Drawing Sheets

Note: Alerts will be sent based on your local time zone.

| Alert Type | Send By | Send To |
|---|---|---|
| ☐ Day Before Delivery Reminder | Select One ▸ | ▸ |
| ☑ Morning of Delivery Alert | SMS Text Message ▸ | Select one ▸ |
| ☑ Delivery Confirmation | E-mail ▸ | jsmith@email.com |

Cancel    OK

SYSTEMS AND METHODS FOR CUSTOMIZED SHIPMENT NOTIFICATIONS

BACKGROUND OF THE INVENTION

Shipping customers are increasing their expectations regarding various delivery services. Thus, new concepts are needed to enhance customer experience and loyalty by improving the delivery experience.

BRIEF SUMMARY OF THE INVENTION

Various embodiments of the present invention involve systems, methods, and computer program products that provide customized messages. In one aspect, a method for sending messages is provided. The method includes the steps of: receiving from a shipper, by a computer system, shipping data comprising a destination address for delivery of an item; receiving, by the computer system, a message address for sending a notification message; receiving, by the computer system, an identification of a triggering event for sending the notification message; receiving, by a computer system, customized data to be included with the message; storing the customized data, by a computer system, in association with the shipping data, the message address and the triggering event identification; and in response to an occurrence of the triggering event, sending the notification message to the message address, by the computer system, and providing access to the customized data.

In another aspect of the invention, a computer system including at least one processor and at least one memory including computer program code is provided. The at least one memory and the computer program code are configured to, with the processor, cause the computer system to at least: receive from a shipper shipping data comprising a destination address for delivery of an item; receive a message address for sending a notification message; receive an identification of a triggering event for sending the notification message; receive customized data to be included with the message; store the customized data in association with the shipping data, the message address and the triggering event identification; and in response to an occurrence of the triggering event, send the notification message to the message address, by the computer system, and providing access to the customized data.

In a further aspect, a computer program product for facilitating customized messages is provided. The computer program product includes at least one computer-readable storage medium having computer-readable program code portions stored therein, the computer-readable program code portions including: an executable portion configured to receive from a shipper shipping data comprising a destination address for delivery of an item; an executable portion configured to receive a message address for sending a notification message; an executable portion configured to receive an identification of a triggering event for sending the notification message; an executable portion configured to receive customized data to be included with the message; an executable portion configured to store the customized data in association with the shipping data, the message address and the triggering event identification; and an executable portion configured to, in response to an occurrence of the triggering event, send the notification message to the message address, by the computer system, and providing access to the customized data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview

Various embodiments of the present invention involve systems, methods, and computer program products that provide customized messages. In certain embodiments, notifications can be customized. For example, a carrier may provide a service that allows a shipper to identify types of messages to be sent to the consignee when certain triggering events occur. These messages may include tracking data, audio data, image data and/or video data previously uploaded by shipper. In some cases, the messages may include a hyperlink or other pathway link to audio, image and/or video files stored on a carrier, shipper or third-party computer system. The messages may be personal messages (e.g., birthday wish), information about the item being delivered (e.g., features, assembly instructions) and/or return instructions. After delivery, the system may also facilitate a return message. The return message may be an image of the item being delivered and/or consignee pursuant to a request from the shipper or the consignee.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

Figure 1:
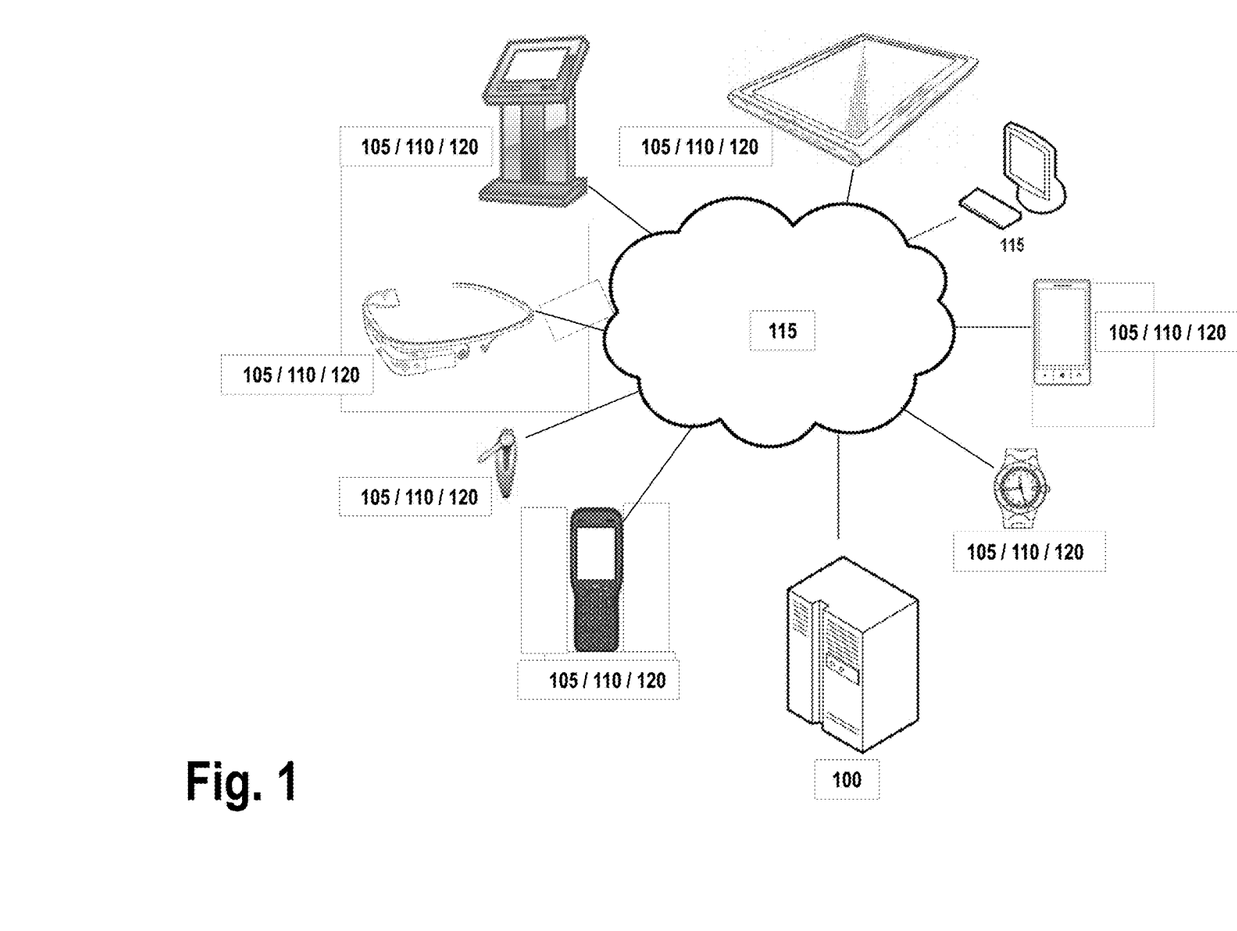
FIG. 1 is an overview of a system that can be used to practice embodiments of the present invention.

FIG. 1 provides an illustration of a system that can be used in conjunction with various embodiments of the present invention. As shown in FIG. 1, the system may include one or more carrier systems 100, one or more mobile stations 105, one or more consignee computing devices 110, one or more networks 115, and one or more shipper computing devices 120. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain communication system entities as separate, standalone entities, the various embodiments are not limited to this particular architecture.

1. Exemplary Carrier System

Figure 2:
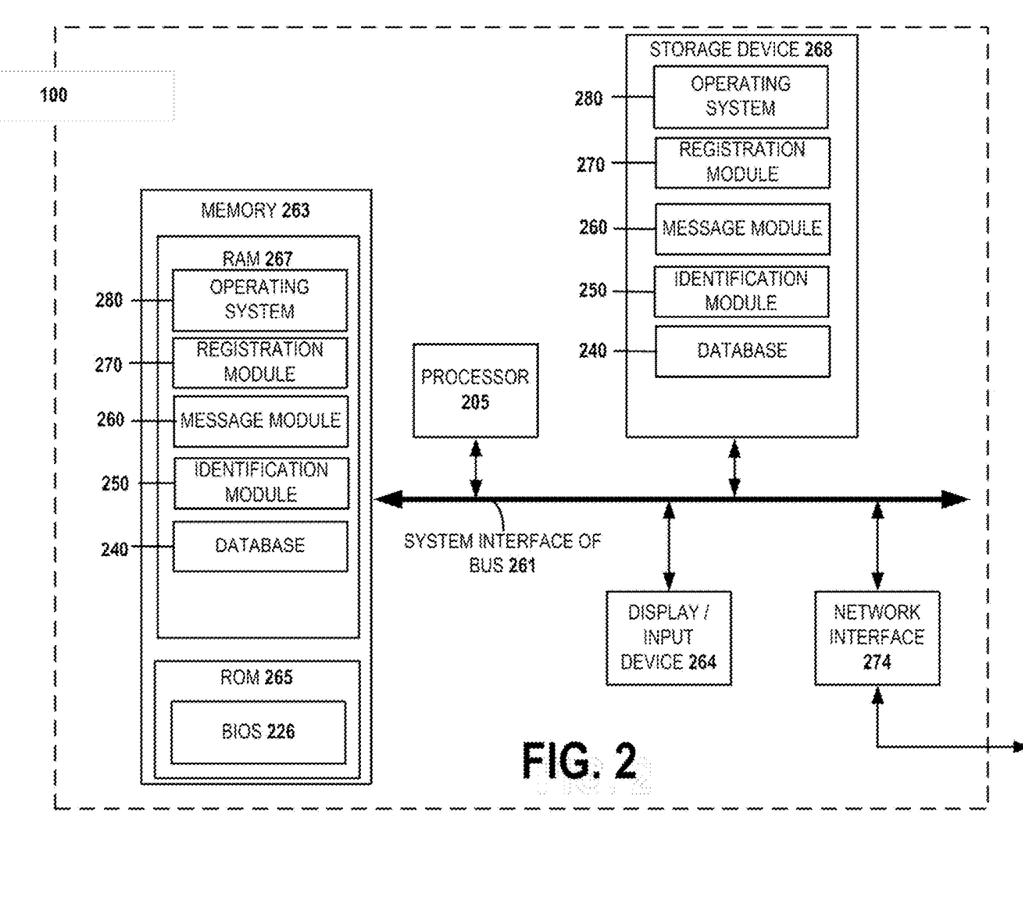
FIG. 2 is an exemplary schematic diagram of a carrier system according to one embodiment of the present invention.

FIG. 2 provides an exemplary schematic of a carrier system 100 according to one embodiment of the present invention. In general, the term "system" may refer to, for example, one or more computers, computing devices, mobile phones, desktops, notebooks or laptops, distributed systems, servers, blades, gateways, switches, processing devices, or combination of processing devices adapted to perform the functions described herein. However, the carrier system 100 may also comprise various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components.

As will be understood from FIG. 1, in one embodiment, the carrier system 100 includes one or more processors 205 that communicate with other elements within the carrier system 100 via a system interface or bus 261. The processor 205 may be embodied in a number of different ways. For example, the processor 205 may be embodied as a processing element, processing circuitry, a coprocessor, a controller or various other processing devices including integrated circuits such as, for example, an application specific integrated circuit (ASIC), a field programmable gate array (FPGA), a hardware accelerator, or the like.

In an exemplary embodiment, the processor 205 may be configured to execute instructions stored in memory or otherwise accessible to the processor 205. As such, whether configured by hardware or software methods, or by a combination thereof, the processor 205 may represent an entity capable of performing operations according to embodiments of the present invention when configured accordingly. A display device/input device 264 for receiving and displaying data may also be included in the carrier system 100. This display device/input device 264 may be, for example, a keyboard or pointing device that is used in combination with a monitor. The carrier system 100 may further include transitory and non-transitory memory 263, which may include both random access memory (RAM) 267 and read only memory (ROM) 265. The carrier system's ROM 265 may be used to store a basic input/output system (BIOS) 226 containing the basic routines that help to transfer information to the different elements within the carrier system 100.

In addition, in one embodiment, the carrier system 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 268 may be connected to the system bus 261 by an appropriate interface.

Furthermore, a number of executable instructions, applications, program modules, and/or the like may be stored by the various storage devices 268 and/or within RAM 267. Such executable instructions, applications, program modules, and/or the like may include an operating system 280, a registration module 270, a message module 260, and identification module 250. As discussed in more detail below, these executable instructions, applications, program modules, and/or the like may control certain aspects of the operation of the carrier system 100 with the assistance of the processor 205 and operating system 280—although their functionality need not be modularized. In addition to the program modules, the carrier system 100 may store or be in communication with one or more databases, such as database 240.

Also located within the carrier system 100, in one embodiment, is a network interface 274 for interfacing with various computing entities (e.g., with one or more mobile stations 105). For example, the carrier system 100 may be able to receive data and/or messages from and transmit data and/or messages to the mobile station 105, consignee computing devices 110, and shipper computing devices 120. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier system 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the carrier system's 100 components may be located remotely from other carrier system 100 components. Furthermore, one or more of the components may be combined and additional components performing functions described herein may be included in the carrier system 100.

2. Exemplary Mobile Station

Figure 3:
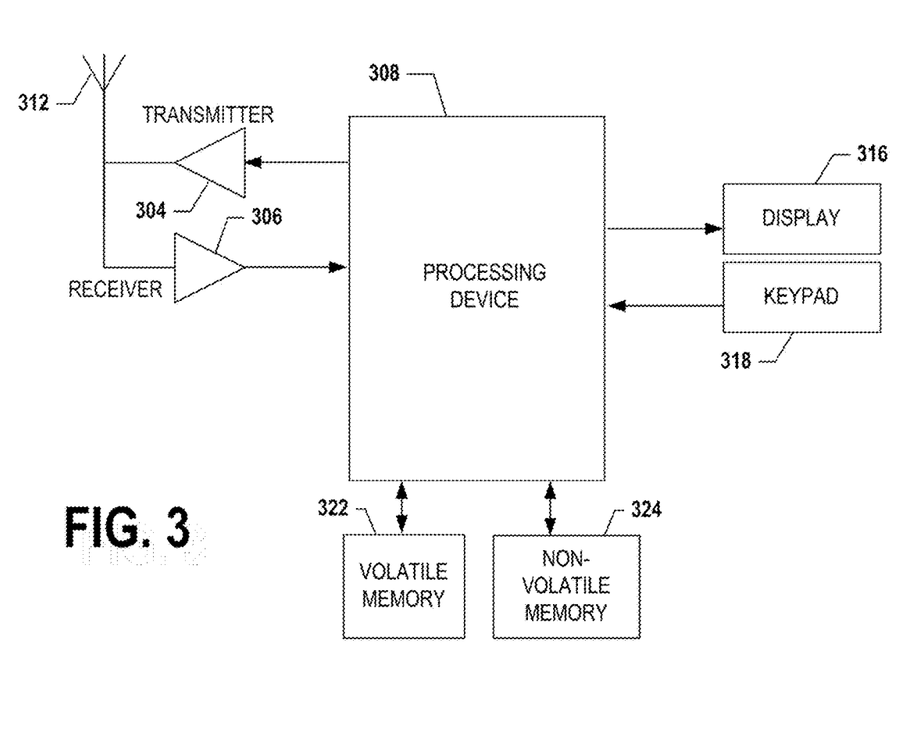
FIG. 3 is an exemplary schematic diagram of a mobile station according to one embodiment of the present invention.

FIG. 3 provides an illustrative schematic representative of a mobile station 105 that can be used in conjunction with the embodiments of the present invention. Mobile stations 105 can be operated by various parties, including carrier personnel (e.g., delivery drivers, sorters, and/or the like). As shown in FIG. 3, the mobile station 105 can include an antenna 312, a transmitter 304 (e.g., radio), a receiver 306 (e.g., radio), and a processing device 308 (e.g., a processor, controller, and/or the like) that provides signals to and receives signals from the transmitter 304 and receiver 306, respectively.

The signals provided to and received from the transmitter 304 and the receiver 306, respectively, may include signaling information in accordance with an air interface standard of applicable wireless systems. In this regard, the mobile station 105 may be capable of operating with one or more air interface standards, communication protocols, modulation types, and access types. More particularly, the mobile station 105 may operate in accordance with any of a number of wireless communication standards and protocols, such as those described above with regard to the carrier system 100. In a particular embodiment, the mobile station 105 may operate in accordance with multiple wireless communication standards and protocols (e.g., using a Gobi radio), such as GSM, UMTS, 1×RTT, and EVDO, and use multiple wireless carriers. To do so, the mobile station 105 may include integrated mobile reception diversity and integrated power management. Such a configuration can provide for global connectivity to the user.

Via these communication standards and protocols, the mobile station 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile station 105 can also download changes, add-ons, and updates, for instance, to its firmware, software (e.g., including executable instructions, applications, program modules), and operating system.

According to one embodiment, the mobile station 105 may include a location determining device and/or functionality. For example, the mobile station 105 may include a Global Positioning System (GPS) module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile station 105 may also comprise a user interface (that can include a display 316 coupled to a processing device 308) and/or a user input interface (coupled to the processing device 308). The user input interface can comprise any of a number of devices allowing the mobile station 105 to receive data, such as a keypad 318, a touch display, voice or motion interfaces, or other input device. In embodiments including a keypad 318, the keypad 318 can include the conventional numeric (0-9) and related keys (#, *), and other keys used for operating the mobile station 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile station 105 can also include volatile memory 322 and/or non-volatile memory 324, which can be embedded and/or may be removable. For example, the non-volatile memory may be embedded or removable MMCs, secure digital SD memory cards, Memory Sticks, EEPROM, flash memory, hard disk, or the like. The memory can store any of a number of pieces or amount of information and data used by the mobile station 105 to implement the functions of the mobile station 105. The memory can also store content, such as computer program code for an application and/or other computer programs.

3. Exemplary Consignee Computing Device

The consignee computing devices 110 may each include one or more components that are functionally similar to those of the carrier system 100 and/or mobile station 105. For example, in one embodiment, each of the consignee computing devices may include: (1) a processor that communicates with other elements via a system interface or bus; (2) a user interface; (3) transitory and non-transitory memory; and (4) a communications interface. As noted, the consignee computing device 110 may comprise a user interface (that can include a display device/input device coupled to a processing element 308) and/or a user input interface (coupled to a processing element 308). For example, the user interface may be a carrier application, browser, user interface, dashboard, webpage, and/or similar words used herein interchangeably executing on and/or accessible via the consignee computing device 110 to interact with and/or cause display of information from the carrier system 100, as described herein. These architectures are provided for exemplary purposes only and are not limiting to the various embodiments. The term "computing device" is used generically to refer to any computer, computing device, desktop, notebook or laptop, distributed system, carrier system, gateway, switch, or other processing device adapted to perform the functions described herein. A customer may refer to either a shipper (e.g., a party shipping an item via carrier) or a consignee (e.g., a party receiving an item from a carrier). In the returns context, a consignee who received an item can become a shipper when returning an item.

4. Exemplary Shipper Computing Device

The shipper computing devices 120 may each include one or more components that are functionally similar to those of the carrier system 100 and/or mobile station 105. For example, in one embodiment, each of the shipper computing devices may include: (1) a processor that communicates with other elements via a system interface or bus; (2) a user interface; (3) transitory and non-transitory memory; and (4) a communications interface. As noted, the shipper computing device 120 may comprise a user interface (that can include a display device/input device coupled to a processing element 308) and/or a user input interface (coupled to a processing element 308). For example, the user interface may be a carrier application, browser, user interface, dashboard, webpage, and/or similar words used herein interchangeably executing on and/or accessible via the shipper computing device 120 to interact with and/or cause display of information from the carrier system 100, as described herein. These architectures are provided for exemplary purposes only and are not limiting to the various embodiments. The term "computing device" is used generically to refer to any computer, computing device, desktop, notebook or laptop, distributed system, carrier system, gateway, switch, or other processing device adapted to perform the functions described herein. A customer may refer to either a shipper (e.g., a party shipping an item via carrier) or a consignee (e.g., a party receiving an item from a carrier). In the returns context, a shipper who shipped an item can become a consignee when an item is being returned.

III. Exemplary System Operation

Figure 4:
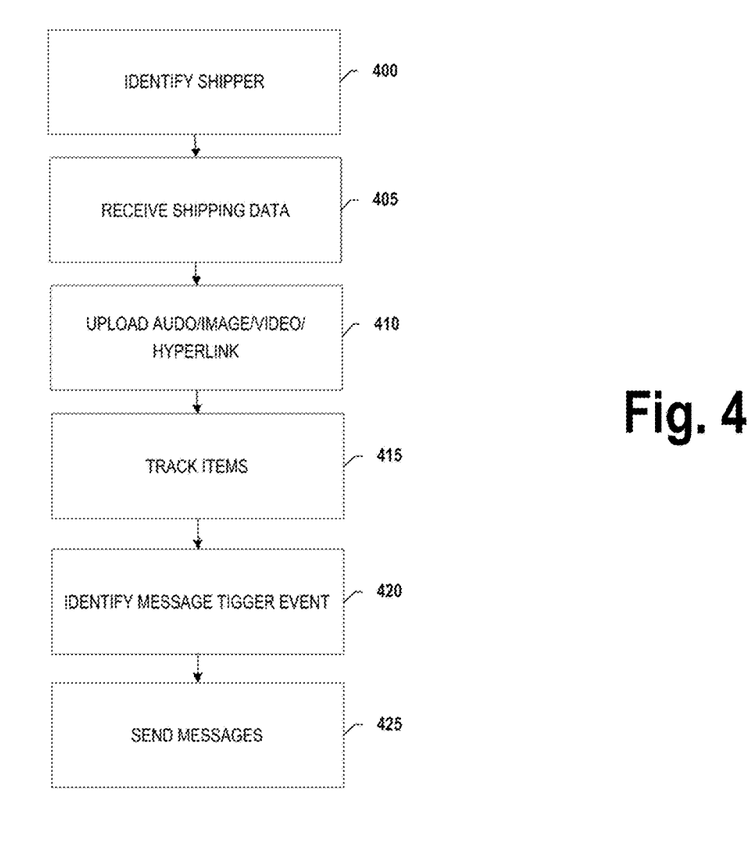
FIG. 4 is a flowchart illustrating operations and processes that can be used in accordance with various embodiments of the present invention.
Figure 5:
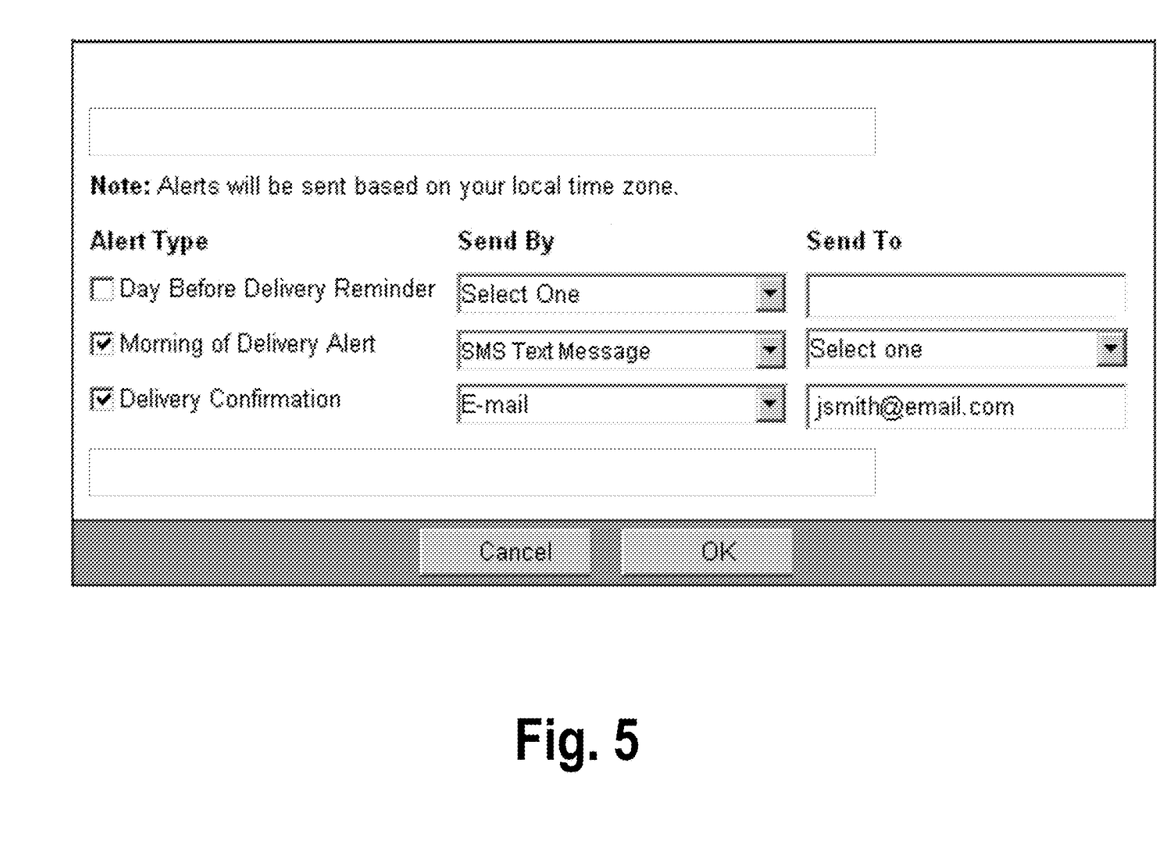
FIG. 5 is an exemplary screenshot illustrating a possible user interface in accordance with various embodiments of the present invention.
Figure 6:
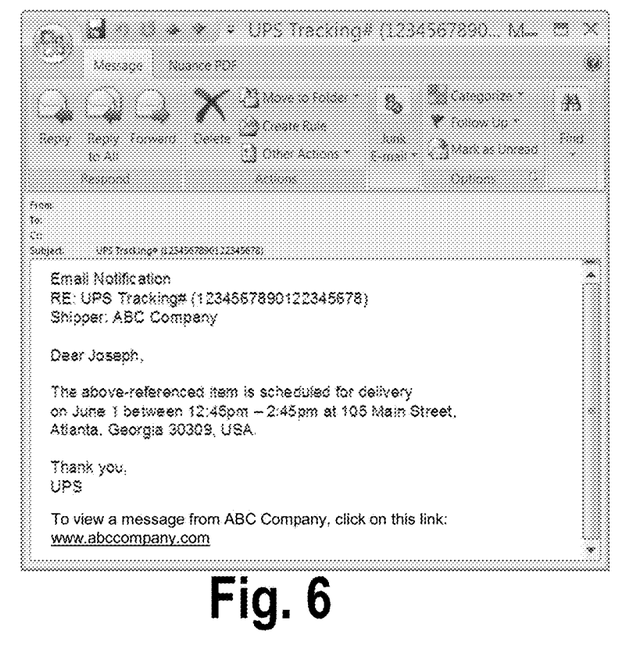
FIG. 6 is an exemplary screenshot illustrating a possible email notification in accordance with various embodiments of the present invention.
Figure 7:
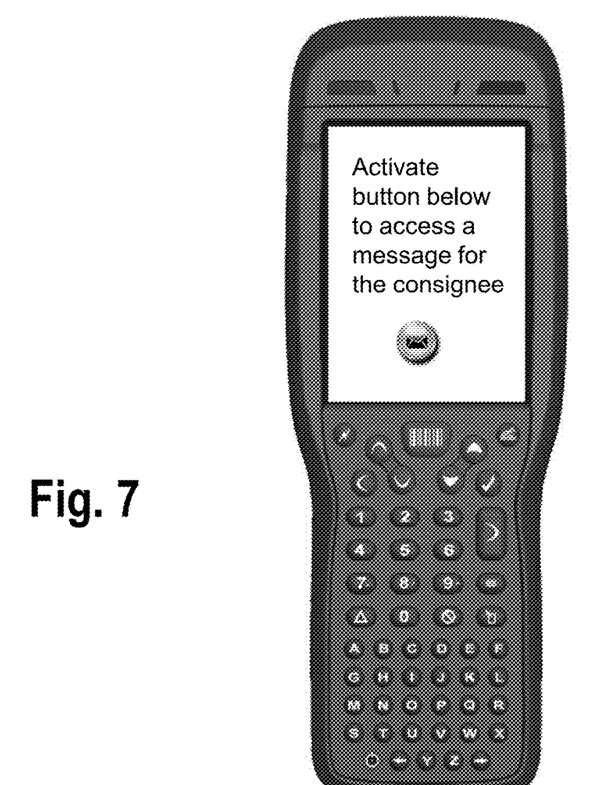
FIGS. 7 and 8 are diagrams illustrating a mobile station providing an instruction in accordance with various embodiments of the present invention.

Reference will now be made to FIGS. 4-7. FIG. 4 is a flowchart illustrating operations and processes that may be performed for providing enhanced messages to shippers and consignees. FIGS. 5-7 show exemplary input and output for the enhanced messages and alerts systems and methods.

1. Scheduling a Delivery

Generally, a shipper can ship an item from one location to a consignee at a different location by employing the services of a carrier that operates the one or more carrier systems 100. As will be recognized, an item may be a parcel or group of parcels, a package or group of packages, scrap metal banded together, a vehicle part, a box, a crate, a drum, a box strapped to a pallet, and/or the like.

In one embodiment, as indicated in Block 400 of FIG. 4, the shipper may initiate the shipping process by entering identifying information. A shipper may be an individual, a family, a company, an organization, an entity, a department within an organization, a representative of an organization and/or person, and/or the like. In various embodiments, the shipper (e.g., a shipper or shipper representative operating a shipper computing device 120) may access a webpage or portal of a carrier, such as United Parcel Service of America, Inc. (UPS). For instance, the one or more carrier systems 100 may transmit a webpage that provides the shipper with an option of logging into an existing account, opening a new account or entering shipping information as a "guest" for a customer pickup and/or delivery of an item.

When opening a new account, the shipper (e.g., operating a shipper computing device 120) may be requested to provide biographic and/or geographic information by the one or more carrier systems 100 (e.g., via the registration module 270). For instance, the shipper may provide the shipper's name, such as a first name, a last name, a company name, an entity name, and/or an organization name. The shipper may also provide any aliases associated with the shipper. For instance, if the shipper were an individual named Joseph Brown, the shipper may provide Joe Brown or Joey Brown as aliases. The shipper may also provide one or more addresses associated with the shipper (e.g., street address, city, state, postal code, and/or country). For instance, Joseph Brown's address may be 105 Main Street, Atlanta, Ga. 30309, USA. As indicated, the shipper may have multiple addresses associated with the account. For instance, Joseph Brown may have a home address and a business address associated with his account. Similarly, an organization may have multiple locations (e.g., addresses) associated with its account. For example, an Amazon account may have one or more address associated with outbound shipments, one or more addresses associated with inbound shipments, and/or one or more addresses associated with return shipments. When multiple addresses are provided, the shipper may indicate which address should be used as the primary address. As will be recognized, the shipper may provide other biographic and/or geographic information to adapt to various needs and circumstances.

In one embodiment, once the one or more carrier systems 100 receives the necessary biographic and/or geographic information from the shipper, the one or more carrier systems 100 may perform one or more validation operations. For example, the one or more carrier systems 100 may determine whether the primary address (and/or other addresses) in the specified country or postal code is eligible for a customer pickup, delivery, and/or returns program. The one or more carrier systems 100 may also determine whether the primary address (and/or other addresses) is valid, e.g., by passing the primary address through one or more address cleansing or standardization systems. The one or more carrier systems 100 may perform a variety of fraud prevention measures as well, such as determining whether the shipper or one of the customer's addresses has been "blacklisted" from customer pickup, and/or delivery. As will be recognized, a variety of other approaches and techniques can be used to adapt to various needs and circumstances.

In one embodiment, the one or more carrier systems 100 may create a shipper profile associated with the account for the shipper via the enrollment/registration process. Accordingly, the one or more carrier systems 100 may create and store various shipper profiles (e.g., via database 240). In addition to at least the information described above, a shipper profile may include one or more corresponding usernames and passwords. Additionally, the one or more carrier systems 100 may also create and store a carrier-assigned shipper identifier in association with the shipper profile. In one embodiment, a carrier-assigned shipper identifier may be used to uniquely identify a shipper profile. In another embodiment, a carrier-assigned shipper identifier may be used to uniquely identify a given address associated with a shipper profile. In such an embodiment, if a shipper profile is associated with four addresses, the one or more carrier systems 100 may create and store four carrier-assigned shipper identifiers in association with the shipper profile. The carrier-assigned shipper identifier may also be stored in association with shipping data for an item to associate the item (and its shipping data) with the (a) correct shipper (e.g., shipper profile) and/or (b) correct address for a shipper.

Assuming the shipper already has a shipper account or has established a new account as described above, the shipper (e.g., a shipper or shipper representative operating a shipper computing device 120) may login to the webpage or portal, e.g., by providing an associated username and password. Alternatively, the shipper may enter identifying information as a "guest" without establishing an account.

Once the shipper is identified (e.g., as an account holder or guest), the shipper may initiate a shipment at Block 405. In various embodiments, the one or more carrier system 100 may then provide a user interface (e.g., browser, dashboard, application) for the shipper to provide shipment data which includes certain details regarding the proposed shipment. In various embodiments, the shipment data may include a name, street address, city, state, postal code, country, telephone number and the like for both the shipper and the consignee. In various embodiments, the user interface may comprise a fillable form with fields including ship-from data and ship-to data. In various embodiments, some of the data fields may be pre-populated. For example, if the shipper logged into a registered account, the address data entered during registration may be pre-populated in the ship-from data fields. In some embodiments, the shipper may also have an associated address book comprising address data for possible consignees (e.g., ship-to addresses).

In one embodiment, once the one or more carrier systems 100 receives the ship-to and ship-from information from the shipper, the one or more carrier systems 100 may perform one or more validation operations. For example, the one or more carrier systems 100 may determine whether the primary address (and/or other addresses) in the specified country or postal code is eligible for a pickup or delivery. The one or more carrier systems 100 may also determine whether the primary address (and/or other addresses) is valid, e.g., by passing the primary address through one or more address cleansing or standardization systems. The one or more carrier systems 100 may perform a variety of fraud prevention measures as well, such as determining whether the shipper or one of the customer's addresses has been "blacklisted" from customer pickup and/or delivery. As will be recognized, a variety of other approaches and techniques can be used to adapt to various needs and circumstances.

In addition to ship-to and ship-from data, the shipment data may also include information regarding the shipment itself. For the example, the number of packages, the weight and sizes of the packages and the service level. The service level options may be for example Next Day Air, Next Day Air Early AM, Next Day Air Saver, 2nd Day Air, 2nd Day Air Early AM, 3 Day Select, Ground, and/or SurePost.

In one embodiment, the interface (e.g., browser, dashboard, application) in communication with the one or more carrier systems 100 can be used to provide a proactive customize audio and/or video message to the consignee. The customized message may be provided with a notification sent during various stages of the delivery process. In some embodiments, the shipper can identify one or more communication formats for communicating the message to the consignee. The communication formats may include text messages (e.g., Short Message Service (SMS) and/or Multimedia Messaging Service (MMS), email messages, voice messages, and/or a variety of other messages in various communication formats. In various embodiments, the shipper will be prompted by the one or more carrier systems 100 to provide contact information for sending the message pursuant to the desired communication format. For instance, for text messages, the shipper may provide one or more cellular phone numbers. For email messages, the shipper may provide one or more email addresses. And for voice messages, the shipper may provide one or more cellular or landline phone numbers.

In some embodiments, one or more carrier systems 100 may provide a list of possible delivery events that trigger a message. For example, FIG. 5 illustrates (e.g., browser, dashboard, application) in communication with the one or more carrier systems 100 that allows shippers to identify the type of alerts sent and the format used for the alerts (e.g., day before delivery reminder, morning of delivery and delivery confirmation). As illustrated, different formats and/or recipients may be used for the different alerts. Other notification trigger events may include item tendered to carrier, day before scheduled delivery date, day of delivery, delivery completion, exception notifications and the like.

At Block 410, the shipper may be prompted to upload a digital image(s), document(s) audio file(s) and/or video file(s) to be appended to the shipping data and used with the customized message(s). The digital image may be in any format such as for example JPEG, JFIF, JPEG2000, EXIF, TIFF, RAW, DIV, GIF, BMP, PNG, PPM and the like. The documents could also be in any format such as for example DOC, HTMLS, TXT, PDF, and the like. Likewise, the audio files may also be in any format such as for example, WAV, MP3, PCM, AIFF, and the like. Likewise, the audio files may also be in any format such as for example, MOV, AVI, MP4, MKV and the like. The uploaded files may be stored in a database linked to the shipment data. In some embodiments, the carrier may limit the size of the files being uploaded. In various embodiments, a hyperlink may be uploaded which may direct a user to the shipper's website, a file stored on the one or more carrier systems 100, a YouTube video, or other information stored on a shipper computer or third party computer.

Once the shipment data has been entered and validated, the one or more carrier systems 100 may generate an item/shipment identifier and a digital representation of a label for use by the shipper for the shipment. In various embodiments, the one or more carrier systems 100 send the digital representation of the label to the shipper computer device such that the label may be printed. In various embodiments, the label may include both human-readable indicia and machine readable indicia such as such as a barcode, a MaxiCode, electronic representation, and/or text (e.g., alphanumeric text).

The unique item/shipment identifier (e.g., 123456789) may be used by the carrier to identify and track the item as it moves through the carrier's transportation network. Such item/shipment identifiers can be affixed to items by, for example, using a label (e.g., sticker) with the unique item/shipment identifier printed thereon (in human and/or machine readable form) or an RFID tag with the unique item/shipment identifier stored therein.

2. Item Matching

As noted, each item may include an item/shipment identifier, such as a barcode, a MaxiCode, electronic representation, and/or text (e.g., alphanumeric text). The unique item/shipment identifier (e.g., 123456789) may be used by the carrier to identify and track the item as it moves through the carrier's transportation network. Such item/shipment identifiers can be affixed to items by, for example, using a sticker (e.g., label) with the unique item/shipment identifier printed thereon (in human and/or machine readable form) or an RFID tag with the unique item/shipment identifier stored therein. In one embodiment, the one or more carrier systems 100 may store an item/shipment identifier in association with shipping data for the item. The shipping data may include information about the item, such as delivery service level. For example, the delivery service level may be Next Day Air, Next Day Air Early AM, Next Day Air Saver, 2nd Day Air, 2nd Day Air Early AM, 3 Day Select, Ground, and/or SurePost. The shipping data may include information about the party shipping the item (e.g., shipper), such as the party's address, the party's phone number, the party's return address, the party's name, and/or the like. The shipping data may also include information about the consignee to whom the item is to be delivered, such as the consignee's address (e.g., delivery location), the consignee's phone number, the consignee's name, and/or the like.

3. Item Tracking

In one embodiment, the shipping data may include information about the item itself and any tracking information. The tracking information may reflect the item's movement in the carrier's transportation network, including expected pickup or delivery date and time. To reflect the item's movement, an item/shipment identifier associated with the item may be scanned or otherwise electronically read at various points as the item is transported through the carrier's transportation network (See Block 415). For example, the unique item/shipment identifier, the carrier-assigned customer identifier may be automatically scanned by a barcode or MaxiCode device, an RFID interrogator, by a camera controller, or by a carrier employee using a handheld device (e.g., mobile station 105). In one embodiment, each time the unique item/shipment identifier is scanned or read, an appropriate device can transmit the unique item/shipment identifier and other appropriate information (e.g., location and time of the scan or reading) to the carrier system 100. The one or more carrier systems 100 can then receive and use the information to track the item as it is transported though the carrier's transportation network and update the shipping data accordingly.

In some embodiments, the carrier may append the shipping data with a carrier-assigned customer identifier such that the corresponding customer (e.g., shipper or consignee) can view tracking information for any shipments associated with the customer's profile. For instance, the one or more carrier systems 100 can be used to identify (e.g., retrieve the shipping data with the appropriate carrier-assigned customer identifier) all shipments associated with a customer (e.g., customer profile) using the carrier-assigned customer identifier (and/or item/shipment identifier and/or a customer-defined handling identifier) and provide them to the customer for viewing in a customer-friendly format, such as via an interface (e.g., browser, dashboard, application). The carrier may provide an interface (e.g., browser, dashboard, application) with a calendar (which may have a day view, a week view, a multiple week view, and/or a month view) having a list of all inbound shipments to a customer. The calendar may be sorted by delivery address, indicating that the customer has more than one delivery address associated with the customer profile. Another interface (e.g., browser, dashboard, application) may provide a list of all inbound shipments to a customer. Various types of interfaces and tracking schemes that may be implemented in conjunction with embodiments of the present invention are described in U.S. Patent Publication No. 2012/0303541, which is incorporated herein in its entirety by reference.

In various embodiments, these concepts can provide customers with ongoing visibility of all inbound packages, as well as preferences, regardless of carrier. Such multi-carrier techniques are described in U.S. Patent Publication No. 2013/0024525, which is incorporated herein in its entirety by reference. For instance, for each item, the interface (e.g., browser, dashboard, application) can be used to show the unique item/shipment identifier, the customer-defined handling identifier, the carrier-assigned customer identifier, the item price, the shipping cost, the order number, the order date, a status indicator, a pickup or delivery indicator, last activity scan date, a non-confirmed pickup or delivery window, a confirmed pickup or delivery window a commit time, whether an in-person signature is requested for delivery, a pickup or delivery service level, and/or various other information. Thus, through such an interface (e.g., browser, dashboard, application), customers (e.g., operating customer computing devices 110/120) can review and access all inbound shipments (from one or more carriers) using a single interface. As will be recognized, though, a variety of other approaches and techniques can be used to provide tracking information to a customer.

In addition to providing tracking information regarding an item, the interface (e.g., browser, dashboard, application) may provide a hyperlink associated with the particular item that is associated with the audio, image and/or video file uploaded with the shipment data. For example, the linked audio/visual message may be a personal message from the shipper (e.g., Happy Birthday), an advertisement, information about the item being shipped (e.g., assembly instructions, feature description) and/or return instructions. In other embodiments, the message may be a link to the shipper's website or a message posted on a third-party website (e.g., YouTube). These links may be customized according to the items being shipped.

In various embodiments, the audio, image and/or video file may be transmitted or otherwise communicated to the mobile station 105 for the consignee to hear and/or see. For example, at delivery a service provider may scan the item being delivered using a mobile station 105 to capture a unique item/shipment identifier associated with the item being delivered and transmit the captured unique item/shipment identifier to the one or more carrier systems 100. Using this unique item/shipment identifier, the one or more carrier systems 100 may access the shipment data and an associated audio, image and/or video file (or a hyperlink to the audio, image or video file) may be transmitted to the service provider's mobile station 105. The mobile station 105 may prompt the service provider to open the file such that the consignee can hear and/or see the message. FIG. 7 illustrates an exemplary mobile station 105 prompting the service provider to play the message. In this example, the service provider may activate the button on the illustrated display to access the audio, image or video file.

4. Proactive Messages/Alerts

In one embodiment, shipper (e.g., operating shipper computing device 120) identifies trigger events in which a message or alert is sent to the shipper and/or the consignee at Block 420. The registration process may indicate the type of messages they want sent to the consignee (e.g., the content) along with an associated triggering event.

In one embodiment, customers (e.g., operating a consignee computing device 110 or shipper computing device 120) may identify/define time periods in which the messages providing information regarding items to be delivered should be transmitted to the customer (e.g., including real-time or near real-time). For instance, the time periods may include (a) after shipment and the day before an item is delivered and (b) after shipment and the morning of the day of delivery. In such cases, the messages can serve as a reminder to the customer that an item is being delivered. Similarly the time periods may be after delivery for confirmation of delivery. The one or more carrier systems 100 can store communication preferences for providing information in association with the customer profiles. Moreover, the communication preferences may apply to the customer profile globally, to selected customer addresses, to groups of items, and/or on an item-by-item basis. In some embodiments, the time periods are defined by the shipper when the shipment data is provided.

In one embodiment, shippers (e.g., shipper computing device 120) may identify/define triggering events for which the messages providing information regarding items should be transmitted to the consignee (e.g., including real-time or near real-time). For instance, the triggering events may be day item is tendered to carrier, the day before delivery, morning of delivery and delivery confirmation item, exception notifications and the like. In some embodiments, the shipper may also define trigger events for return products such as a label or receipt for returning an item, authorizing an item for return, receiving/collecting an item from a shipper for ingestion into the carrier's transportation and logistics network, sortation and/or consolidation of items as defined by a shipper for handling returns, delivery of items to intermediate or final delivery points, after a repair has been started or completed for an item, and/or the like. The returns trigger events may include return messages as explained in greater detail below.

In one embodiment, the one or more carrier systems 100 may impose time constraints for placing, generating, and/or transmitting messages within the time periods identified by the customers. For example, the one or more carrier systems 100 may only transmit text messages to customers between 6:00 am-11:00 pm (based on time zones). Similarly, the one or more carrier systems 100 may place calls and transmit automated voice messages between 8:00 am-9:00 pm (based on time zones). And for email messages, the one or more carrier systems 100 may generate and transmit them without time constraints.

In one embodiment, the one or more carrier systems 100 can automatically generate (e.g., via the message module 260) one or more messages providing information regarding an item to be delivered to the customer (Block 425 of FIG. 4) in compliance with the customer's communication preferences and/or the carrier's time constraints. Similarly, the one or more carrier systems 100 can automatically transmit the one or messages to the electronic destination addresses in compliance with the customer's communication preferences and the carrier's time constraints. For example, the one or more carrier systems 100 may generate (including select) and transmit an email message to Joseph Brown's email address and a text message to Joseph's cellular phone the day before an item is to be delivered to Joseph's home address. The messages may indicate the expected delivery date and/or delivery time, such as shown in FIG. 6, with the previously uploaded audio file, image file, video file or hyperlink to a file. Similarly, the one or more carrier systems 100 can transmit notification messages to the shipper, for example, when corresponding triggering events for returns occur. As will be recognized, a variety of other operations and processes may be used with embodiments of the present invention. These operations and processes can be customized to adapt to various needs and circumstances.

4. Return Messages

Figure 8:
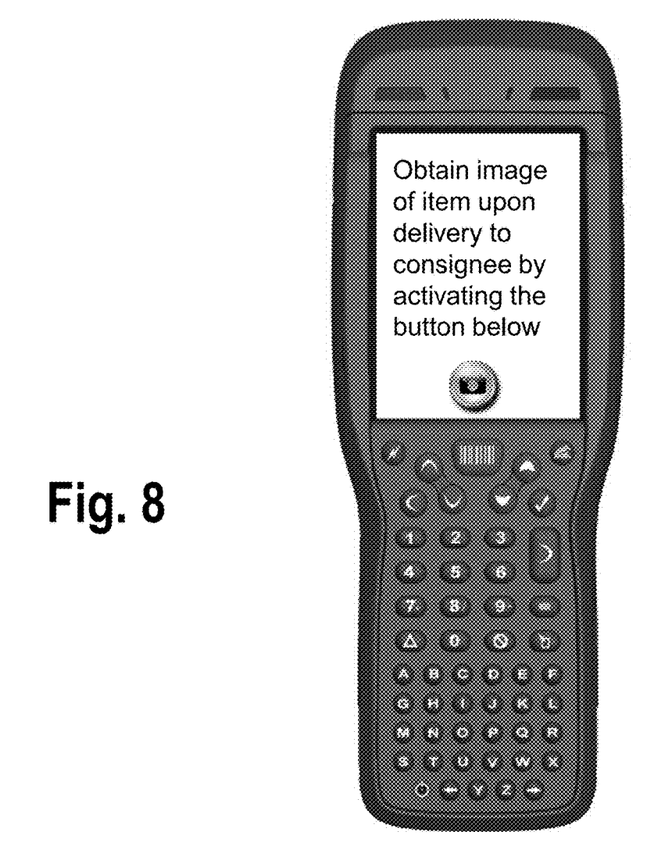

In some embodiments, the shipper may desire to receive confirmation regarding the condition of the item when delivered to the consignee or in connection with a return. In this case, a message may be sent to the mobile station 105 instructing the service provider to capture an image and/or video of the item proximate the time of delivery to the consignee as illustrated in FIG. 8. The proximate time may be upon arrival at the delivery address, during delivery of the item to the consignee and/or after presenting the item to the consignee. The captured image and/or video may be uploaded to the one or more carrier systems 100 by the service provider using the mobile station 105. The one or more carrier systems 100 may subsequently sent the image or video (or a hyperlink to the image or video) in a message to the shipper as desired.

In further embodiments, the shipper may seek confirmation that the item has been delivered to the appropriate individual and/or other proof of delivery. Although current systems may use a signature of the individual receiving an item for proof of delivery, additional and/or alternative verification may be desired. In some embodiments, the service provider may be prompted to capture an audio confirmation and/or image/video of the individual receiving the item. The audio confirmation may be the individual saying her name or stating some other phrase while the image and/or video may be of the individual receiving the item. The audio confirmation could be used to supplement the recipient's signature for proof of delivery where the signature may be difficult to read. The capture audio, image and/or video may be uploaded to the one or more carrier systems 100 by the service provider using the mobile station 105. The one or more carrier systems 100 may subsequently sent the image or video (or a hyperlink to the image or video) in a message to the shipper as desired. In some embodiments, the mobile station 105 may record the present location (via GPS, input regarding address, etc.) when capturing the audio confirmation, image and/or video. This could be used to further provide proof of delivery to the appropriate location.

In other embodiments, the consignee may desire to send a return message to the shipper. In this case, the service provider, using a mobile station 105, may capture an image, audio and/or video message pursuant to a request from the consignee. The one or more carrier systems 100 may subsequently sent the image, audio, or video (or a hyperlink to the image, audio or video) in a message to the shipper as desired.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for sending messages comprising:
providing, over a communications network, a graphical user interface to a shipper computing device, the graphical user interface includes: a first field, a second field, and a third field, the first field associated with a hyperlink that points to at least one of: an audio file, an image file, or a video file, that includes a personal message associated with a shipper of an item, the second field corresponding to a user selection of a predefined triggering event to receive a notification message about, the third field corresponding to a user selection of an electronic message address that the notification message will be sent to;

receiving, over the communications network and from the shipper computing device, by a computer system, shipping data comprising a destination address for delivery of the item;

at least partially in response to the receiving, over the communications network, the shipping data, generating a digital shipping label that is to be affixed to the item and that comprises machine-readable indicia of a carrier-specific tracking identifier scanned by a mobile station to obtain tracking information regarding transport of the item through a carrier's transportation network and presenting the tracking information to a user interface of a display device to enable user interaction with the tracking information and provide visibility of the item in transit, the mobile station configured to be operated by carrier personnel during delivery of the item;

receiving, over the communications network and based on a first user input into the third field of the graphical user interface and by the computer system, the electronic message address for sending the notification message;

receiving, over the communications network and based on a second user input into the second field of the graphical user interface and by the computer system, an identification of the predefined triggering event for sending the notification message;

detecting first coordinates of a geolocation at which the at least one of the audio file, the image file, and the video file was captured by the mobile station of the carrier personnel;

storing the at least one of: the audio file, the image file, and the video file, by a computer system, in association with the shipping data, the electronic message address and the triggering event identification;

detecting second coordinates of a geolocation of the item as the item is being transported through the carrier's transportation network, in part, in response to the mobile station scanning the carrier-specific tracking identifier;

based at least in part on receiving a first indication that the mobile station has scanned the carrier-specific tracking identifier and third user input into the first field, transmitting, over the communications network, the hyperlink to the mobile station and causing the mobile station to prompt the carrier personnel to select the hyperlink comprising the at least one of the audio file, the image file, and the video file;

receiving, over the communications network, a second indication that the hyperlink has been selected, wherein the at least one of the audio file, the image file, and the video file is configured to be played for a recipient of the item on the mobile station; and at least partially in response to the receiving of the second indication that the hyperlink has been selected, automatically transmitting, over the communications network, the notification message to the electronic message address, and providing access within the mobile station to enable user interaction with at least one of the audio file, the image file, and the video file of the customized data.

2. The method of claim 1, wherein the customized data comprises instructions associated with the item.

3. The method of claim 1 further comprising the steps of:
receiving, by the computer system, an identification of a second triggering event for sending a second notification message;
receiving, by the computer system, a second customized data to be included with the second notification message;
storing the second customized data, by the computer system, in association with the shipping data, the message address and the second triggering event identification; and
in response to an occurrence of the second triggering event, sending the second notification message to the message address, by the computer system, and providing access to the second customized data.

4. The method of claim 1 further comprising the steps of:
receiving a return message request;
capturing return customized data; and
sending the return message to the shipper and providing access to the return customized data.

5. The method of claim 4, wherein the return customized data comprises an image, captured by a service personnel using the mobile station, of the item proximate the time of delivery of the item.

6. The method of claim 5, further comprising the step of capturing a location in association with capturing the return customized data.

7. The method of claim 4, wherein the return message request is received from the consignee of the item.

8. The method of claim 1, further comprising:
utilizing the first coordinates, at which the at least one of the audio, image and video content was captured, to provide audio of proof of delivery of the item to the destination address.

9. A computer system comprising at least one processor and at least one memory including computer program code, the at least one memory and the computer program code configured to, with the processor, cause the computer system to at least:
receive, over a communications network and from a shipper computing device, shipping data comprising a destination address for delivery of an item;
receive, over the communications network and based on a first user input into a graphical user interface of the shipper computing device, an electronic message address for sending a notification message;
receive, over the communications network and based on a second user input into the graphical user interface, an identification of a predefined triggering event for sending the notification message;
detect, via a geolocation sensor, a geolocation at which the at least one of an audio file, an image file, and a video file was captured by the communication device of the service provider;
receive, over the communication network and via the shipper computing device, customized data comprising at least one of the audio file, the image file, and the video file, to be included with the notification message;
transmit, over the communication network and to a communication device of a service provider while on a delivery route to deliver the item, the customized data;
store the customized data in association with the shipping data, the electronic message address and the triggering event identification;

in response to a mobile scanning device scanning the carrier-specific tracking identifier, detect a geolocation of the item as the item is being transported through the carrier's transportation network, in part; and based on: the detecting via the geolocation sensor, the mobile scanning device scanning the carrier-specific tracking identifier, and an occurrence of the predefined triggering event, automatically transmit the notification message to the electronic message address, and providing access to the retrieved customized data to the communication device to enable user interaction with at least one of the audio file, the image file, and the video file of the customized data that was: (i) captured by the communication device of the service provider while on a delivery route to deliver the item and (ii) tailored for the shipper pertaining to the item being shipped and includes a personal message about the shipper.

10. The computer system of claim 9, wherein the customized data further comprises a hyperlink.

11. The computer system of claim 10, wherein the customized data is a hyperlink that points to the audio file, the image file, or the video file located on the shipper's computer system.

12. The computer system of claim 9, wherein the customized data comprises instructions associated with the item.

13. The computer system of claim 9 wherein the at least one memory and the computer program code are further configured to, with the processor, cause the computer system to at least:
receive, by the computer system, an identification of a second triggering event for sending a second notification message;
receive, by a computer system, a second customized data to be included with the second notification message;
store the second customized data, by a computer system, in association with the shipping data, the message address and the second triggering event identification; and
in response to an occurrence of the second triggering event, send the second notification message to the message address, by the computer system, and providing access to the second customized data.

14. The computer system of claim 9 wherein the at least one memory and the computer program code are further configured to, with the processor, cause the computer system to at least:
receive a return message request;
receive return customized data; and
send the return message to the shipper and providing access to the return customized data.

15. The method of claim 14, wherein the return customized data comprises an image captured by the carrier of the item after being delivered.

16. The method of claim 15, wherein the return message request is received from the consignee of the item.

17. The computer system of claim 9 wherein the at least one memory and the computer program code are further configured to, with the processor, cause the computer system to at least:
utilize the detected geolocation, at which the at least one of the audio, image and video content was captured, to provide audio of proof of delivery of the item to the destination address.

18. A computer program product for facilitating customized messages, the computer program product comprising at least one non-transitory computer-readable storage medium having computer-readable program code stored therein, the computer-readable program code, when executed by one or more processors, cause the one or more processors to:
provide, over a communications network, a graphical user interface to a shipper computing device, the graphical user interface includes a plurality of fields;
receive, in response to a selection of the first field of the plurality of fields within the graphical user interface, from a shipper shipping data comprising a destination address for delivery of an item;
generate, in response to a selection of a second field of the plurality of fields within the graphical user interface, a digital shipping label that is to be affixed to the item and that comprises machine-readable indicia of a carrier-specific tracking identifier scanned by a mobile scanning device to obtain tracking information regarding transport of the item through a carrier's transportation network and present the tracking information to a user interface of a display device to enable user interaction with the tracking information and provide visibility of the item in transit;
receive, in response to a selection of a third field of the plurality of fields within the graphical user interface, an electronic message address for sending a notification message;
receive, in response to a selection of a fourth field of the plurality of fields within the graphical user interface, an identification of a predefined triggering event for sending the notification message;
receive, in response to a download within the graphical user interface, customized data comprising at least one of captured audio, image and video content, captured by a communication device of a service provider while delivering the item, to be included with the notification message, which further comprises a personal message about the shipper of the item, generated by the service provider delivering the item;
detect, in response to the download within the graphical user interface, a geolocation at which the at least one of the audio, image and video content was captured;
store the customized data in association with the shipping data, the electronic message address and the triggering event identification selected within the graphical user interface;
detect a geolocation of the item as the item is being transported through the carrier's transportation network, in part, in response to the mobile device scanning the carrier-specific tracking identifier; and
in response to (a) detecting that the carrier-specific tracking identifier is scanned by the mobile scanning device during delivery of the item, retrieve the stored customized data and in response to (b) an occurrence of the triggering event selected in the graphical user interface, automatically transmit the notification message to the electronic message address, by the computer system, and providing access to the retrieved customized data to the user interface of the display device to enable user interaction with at least one of the audio, the image and the video content of the customized data that was (i) captured by the communication device of the service provider while delivering the item, was downloaded on the graphical user interface, and (ii) is tailored for the shipper pertaining to the item being delivered and includes the personal message about the shipper.

19. The computer program product of claim 18, wherein the customized data further comprises a hyperlink.

20. The computer program product of claim 18, wherein the customized data is a hyperlink that points to an audio file, an image file, or a video file located on the shipper's computer system.

21. The computer program product of claim 18, wherein the customized data comprises instructions associated with the item.

22. The computer program product of claim 18, wherein the computer-readable program code, when executed by one or more processors, further cause the one or more processors to:
- receive an identification of a second triggering event for sending a second notification message;
- receive a second customized data to be included with the second notification message;
- store the second customized data, by a computer system, in association with the shipping data, the message address and the second triggering event identification; and
- in response to an occurrence of the second triggering event, send the second notification message to the message address, by the computer system, and providing access to the second customized data.

23. The computer program product of claim 18, wherein the computer-readable program code, when executed by one or more processors, further cause the one or more processors to:
- receive a return message request;
- receive return customized data; and
- send the return message to the shipper and providing access to the return customized data.

24. The computer program product of claim 23, wherein the return customized data comprises an image captured by the carrier of the item after being delivered.

25. The computer program product of claim 24, wherein the return message request is received from the consignee of the item.

26. The computer program product of claim 18, further comprising:
- an executable portion configured to utilize the detected geolocation, at which the at least one of the audio, image and video content was captured, to provide audio of proof of delivery of the item to the destination address.

* * * * *

UNITED STATES PATENT AND TRADEMARK OFFICE
CERTIFICATE OF CORRECTION

PATENT NO. : 10,482,415 B1
APPLICATION NO. : 14/099468
DATED : November 19, 2019
INVENTOR(S) : Andrew Dotterweich, Juan Perez and Jean Mense Page 1 of 1

It is certified that error appears in the above-identified patent and that said Letters Patent is hereby corrected as shown below:

In the Claims

Column 17, Line 53: Please remove "method" and replace with -- system --.
Column 17, Line 56: Please remove "method" and replace with -- system --.

Signed and Sealed this
Fourth Day of February, 2020

Andrei Iancu
*Director of the United States Patent and Trademark Office*